Seymour & Morgan.
Harvester Rake.
No 20515. Patented Jun. 8, 1858.
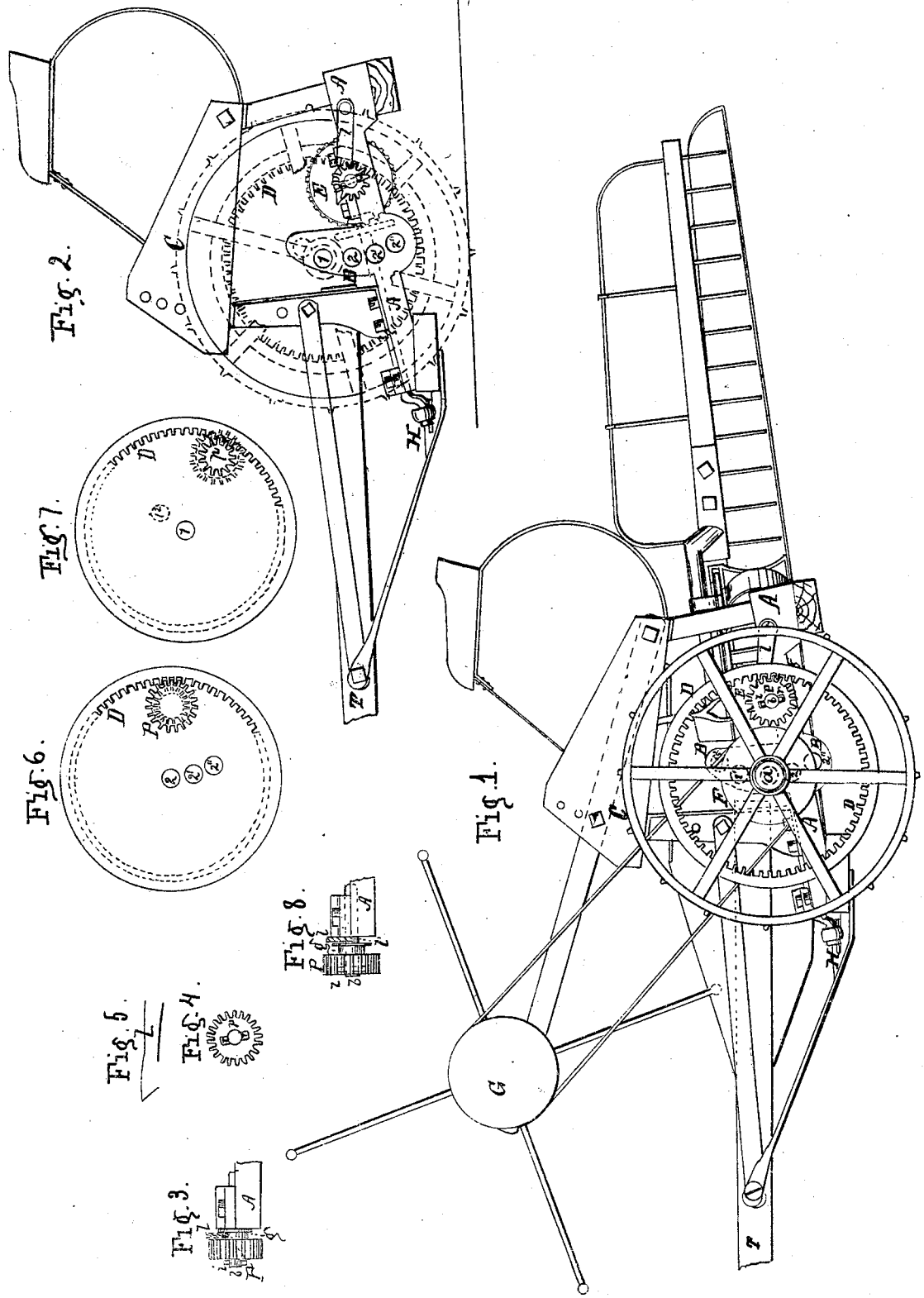

UNITED STATES PATENT OFFICE.

W. H. SEYMOUR AND D. S. MORGAN, OF BROCKPORT, NEW YORK.

IMPROVEMENT IN HARVESTING-MACHINES.

Specification forming part of Letters Patent No. 20,515, dated June 8, 1858.

*To all whom it may concern:*

Be it known that we, WILLIAM H. SEYMOUR and DAYTON S. MORGAN, both of Brockport, in the county of Monroe and State of New York, have invented a new and useful Improvement in Machines for Cutting Grain or Grass, of which the following is a full, clear, and exact description, reference being had to the accompanying drawings, forming part of this specification, in which—

Figure 1 represents a side view of a harvesting-machine with an automatic rake attached, in which figure certain parts screened from view by the parts drawn in black lines are either dotted or drawn in red lines. Fig. 2 shows a similar side view (but with the reel, raking mechanism, and platform detached) in which the driving and main gear wheels are only partially shown in red lines. Fig. 3 shows an edge view of one of the pinions when on its shaft, but before being engaged with the linchpin, which prevents it from turning upon the shaft. Fig. 4 shows an outside view of the same, with the recess for engaging the linchpin. Fig. 5 represents the form of the latch which, when dropped into its place, keeps the pinion engaged with the linchpin, as shown in Fig. 8. Fig. 6 is a diagram showing the relative positions of the axes and teeth of the pinion and driving spur-wheel when the machine is used as a reaper; and Fig. 7 shows the relative positions of the same parts when the machine is used as a mower, the red lines representing in each case the pinion which cannot be used, and showing why it cannot be used, as will hereinafter be explained.

The nature of our invention consists in providing a means of changing the rate of motion of the cutter, and also, if necessary, at the same time, of changing the height of the machine, or of its cutting with reference to the ground, but in such a manner that the parts to be changed cannot be mistaken or improperly applied.

In the drawings, A represents a beam forming part of the frame of the machine, and which carries the bearings for the wheel and pinion, to be described. A standard, B, projects above and below from this frame sufficiently to allow holes 1 2 2' 2" to be made in it for the axle $a$, Fig. 1, of the driving-wheel C in as many different positions as may be required. This axle $a$, Fig. 1, may be secured in any suitable manner, as by a head upon its outside and a nut on the inside of the frame through which it passes.

The driving-wheel is furnished with an internal-gear wheel, D, attached to its arms or spokes in any suitable way. Within this wheel is engaged one of two pinions, either the larger one, P, (shown in Fig. 1,) or the smaller one, $p$, (shown in Fig. 2.) This pinion is removable at pleasure by being slipped upon the shaft $b$, and when placed is prevented from coming off and also from turning by a linchpin, $i$. When the pinion is put upon the shaft the linchpin is introduced into its place, as shown in Fig. 3, and the pinion is brought outward again, and so turned that the recess $r$ upon its outer face engages with the linchpin. The latch $l$ is then dropped into its place at $l'$, between the pinion and the side of the frame A, and, being held there by its own weight, keeps the pinion engaged with the linchpin, as shown in Fig. 8, and also in Figs. 1 and 2.

The pinion-shaft $b$ carries a bevel-wheel, E, which gives motion to the cutter.

Attached to the driving-wheel is a pulley, F, which, by means of an endless band, drives another pulley, G, and the reel, upon the axis of which it is mounted.

The side view of the line of cutters is shown at H.

The machine is drawn by a tongue, T, to which the horses are attached.

When the machine is put in operation the driving-wheel C travels over the ground and revolves with its attached inner gear-wheel, D, which engages with the pinion P, (or $p$, whichever is being used,) which pinion, by means of the recess $r$ and the linchpin $i$, causes the shaft $b$ to turn, and with it the bevel-wheel E, fastened upon it, thus imparting motion to the cutting mechanism. At the same time the pulley F gives motion to the reel.

When it is desired to move the machine without operating the cutter, as in going from place to place, this may be done without removing the pinion from the shaft $b$, as for this purpose the latch is loosely hung upon its pin, or has sufficient length and spring to enable it, when raised and the pinion pushed back, to be dropped into the groove $g$ on the pinion, as shown in red in Fig. 3. The pinion is by this means kept from engaging with the linchpin and revolves loose upon the shaft $b$, which then does not turn or give motion to the cutting mechanism.

While the machine is employed as a mower the smaller, p, of the two pinions must be used in order to give a more rapid motion to the cutter. This is done by placing the driving-wheel, as shown in Fig. 2, with its replaceable journal in the hole 1 in the standard B. When the machine is used for reaping grain and so rapid a motion of the cutter is not required, the larger pinion, P, is placed upon the shaft b, while the removable axle of the driving-wheel is put in the hole 2.

The proper distance for the holes in which the axle of the driving-wheel is to be placed from the pinion-shaft will be determined by the size of the pinion to be used.

The distance between the center of the axle of the driving-wheel, or of the hole in which it is to be placed, and the center of the pinion-shaft should be the difference of the radii of the pitch-circles of the pinion to be used and of the main gear-wheel. The two pinions should be of such relative sizes that the outer parts of the teeth of the smaller shall fall within the inner parts of the teeth of the larger, if placed one upon the other. If this is the case, it will be seen that when the driving-wheel is placed with its axle in the hole 1, when the more rapid motion is to be given the smaller pinion only can be put upon the shaft b, as the larger one would project over the main gear-wheel, as shown in Fig. 7. On the other hand, when the driving-wheel is to be so placed as to give a slower rate of motion, and with its axle in the hole 2, the larger pinion only can be used, for if the smaller one is put upon the shaft it will not engage in the main gear-wheel, as is shown in Fig. 6, and the cutter will not operate.

The wheel D has been represented with an internal gear, as we deem this the most convenient because it allows the pinions and parts to which they are attached to be more compactly arranged; but in place of it an external-gear wheel may be used if the following rule is observed: When inside, the distance between the centers of the driving-wheel axle and pinion-shaft must be the difference of the radii of the pitch-circles of the wheel and pinion; but when outside it must be their sum.

When the machine is used to mow grass it is required to be hung low, so as to bring the cutter near the ground. When used as a reaper it is advantageous to have it more elevated, and different heights of grain or other circumstances may require different heights while so used, although the rate of speed of the cutter may remain the same. This change of height of the machine or cutter from the ground may be made in various ways; but we prefer to make it at the same time with that of the change of gear, and the means we have devised are such that the same operation unfailingly attains both ends. For this purpose the holes for the axle of the driving-wheel should be placed above each other, so that when the wheel is in its proper place the height of the machine or of its cutters will be such as suits the rate of speed determined by the pinion to be used. Whatever number of holes corresponding to different elevations of the machine when used for reaping may be required, they must be arranged on the standard in an arc of which the center of the pinion-shaft is the center. It is evident that in either of the positions the larger pinion would still be in gear with the main wheel D and communicate the same rate of motion to the cutter. Such holes are shown in the drawings at $2'$ $2''$.

It may also be found desirable to use the machine as a mower at different heights from the ground. This can be done by the use of other holes on an arc of which the center of the shaft is the center, the distance being now to the center of the hole 1, as shown in the drawings, the upper hole, $1^2$, being dotted.

From this description it will be seen that the advantages of this arrangement of parts are that while changing the rate of motion of the cutter and, if necessary, the height of the machine from the ground the only other change to be made is that of one pinion for another, and that in no case can the wrong pinion be used. This change in the height of the machine is so evident to the eye that less skill is required to make it than the change of the pinions. If there were a chance for the wrong pinion being put on and used, an unskillful workman, by doing so, might damage or seriously injure the machine, as it is well known that changeable gearing not having the proper position will, if it is attempted to be worked, break or at least injure the teeth of one or the other of the parts improperly meeting. By our invention there can but two cases occur when the wrong pinion is put on. In the one case the driving-wheel cannot be put in its place, (see Fig. 7,) and in the other the wheels would not engage and the machine would not operate. (See Fig. 6.) We have also further shown that the change in the height of the machine may be made simultaneously with the change of gear, and that, notwithstanding the operations being thus performed at once, there is still no more chance of error than when one only is performed.

We are aware that various modes of changing the gear and the velocity of the cutter have been used in which the adjustments are arbitrarily made; but these require skill and care on the part of the persons employed. These we do not claim; but What we do claim as our invention, and desire to secure by Letters Patent, is—

1. The combination of the changeable pinions and gear-wheel actuating the cutters of reaping and mowing machines, with their centers so situated relatively that the changeable parts shall always exactly fit and gear when properly placed, and not otherwise, the whole being arranged and operating substantially as set forth.

2. The combination of the replaceable pinions with the series of holes for the axle of the driving-wheel of reaping and mowing machines, so arranged with relation to each other that while the rate of motion of the cutter is changed the height of the cutter from the ground may be varied at the same time, the proper rate of motion for the different heights being always secured, and in such manner that the changeable parts shall always fit and gear when properly placed, and not otherwise.

In testimony whereof we have hereunto subscribed our names.

WM. H. SEYMOUR.
D. S. MORGAN.

Witnesses:
GEO. H. ALLEN,
AUSTIN HARMON.